United States Patent [19]

Stephenson, Jr. et al.

[11] Patent Number: 5,081,654
[45] Date of Patent: Jan. 14, 1992

[54] PARALLEL BIT DETECTION CIRCUIT FOR DETECTING FRAME SYNCHRONIZATION INFORMATION IMBEDDED WITHIN A SERIAL BIT STREAM AND METHOD FOR CARRYING OUT SAME

[75] Inventors: William H. Stephenson, Jr.; William E. Powell; Richard W. Peters, all of Raleigh; William B. Weeber, Apex, all of N.C.

[73] Assignee: Alcatel NA Network Systems Corp., Raleigh, N.C.

[21] Appl. No.: 351,723

[22] Filed: May 12, 1989

[51] Int. Cl.⁵ .......................... H04L 7/00; H04J 3/06
[52] U.S. Cl. .................... 375/106; 370/105.1; 364/939.5; 364/950.3; 364/945.9
[58] Field of Search ... 364/200 MS File, 900 MS File; 375/106, 114, 116; 370/105.1, 105.4, 105.5

[56] References Cited

U.S. PATENT DOCUMENTS

| | | | |
|---|---|---|---|
| 4,079,372 | 3/1978 | Koenig | 341/100 |
| 4,447,804 | 5/1984 | Allen | 341/100 |
| 4,672,362 | 6/1987 | Furukawa et al. | 341/95 |
| 4,674,088 | 1/1987 | Grover | 370/105.3 |
| 4,675,652 | 6/1987 | Machado | 341/59 |
| 4,920,535 | 4/1990 | Watanabe et al. | 370/105.1 |
| 4,920,546 | 4/1990 | Iguchi et al. | 375/106 |
| 4,984,238 | 1/1991 | Watanabe et al. | 370/105.1 |
| 5,014,272 | 5/1991 | Yoshida | 370/106 |

FOREIGN PATENT DOCUMENTS

| | | |
|---|---|---|
| 0191890 | 5/1985 | European Pat. Off. . |
| 0178192 | 7/1985 | European Pat. Off. . |
| 0249935 | 6/1987 | European Pat. Off. . |
| 0311251 | 9/1988 | European Pat. Off. . |
| 3501674 | 7/1986 | Fed. Rep. of Germany . |
| 2538647 | 12/1982 | France . |

OTHER PUBLICATIONS

EPO Search Report EP 90 108 730.4 English translation of French Patent Application 2 538 647's Abstract.

Primary Examiner—Allen R. MacDonald
Assistant Examiner—Gopal C. Ray
Attorney, Agent, or Firm—Ware, Fressola, Van Der Sluys & Adolphson

[57] ABSTRACT

A parallel frame synchronization circuit converts an incoming serial bit stream containing frame synchronization information into parallel data words on arbitrary boundaries of fixed bit length. Detectors forming part of the present invention determine from the parallel converted data the presence of synchronization information so as to align the incoming serial data into parallel data aligned on frame boundaries by manipulating parallel words. The present invention is particularly suited for fabrication in complimentary metal oxide silicon (CMOS) technology and in a preferred embodiment is used to synchronize incoming data comporting to the synchronous optical network (SONET) telecommunication standard.

21 Claims, 6 Drawing Sheets

STS-1
SIGNAL FORMAT
51.84 MB/S

A1 A2 FRAMING BYTES = F6 28 (HEX)

STS-3
SIGNAL FORMAT
155.52 MB/S

3 A1 BYTES EACH = F6 (HEX)
3 A2 BYTES EACH = 28 (HEX)

PARALLEL BIT DETECTION CIRCUIT FOR DETECTING FRAME SYNCHRONIZATION INFORMATION IMBEDDED WITHIN A SERIAL BIT STREAM AND METHOD FOR CARRYING OUT SAME

TECHNICAL FIELD

The present invention relates to a frame synchronization method and circuit for comparing a known framing pattern to an incoming serial bit stream which contains periodic frame synchronization information so as to determine frame synchronization of the incoming data and further wherein the incoming data is first converted into parallel data of a fixed length in order to perform the frame synchronization determination with lower speed circuitry than that of the incoming serial data.

BACKGROUND OF THE INVENTION

Generally frame synchronization of an incoming serial bit data stream is performed by comparing a known framing pattern to the incoming data which contains periodic frame synchronization information so as to determine the frame boundary (start of frame) based upon matching the frame synchronization information to the framing pattern.

As the speed of the data stream increases, faster logic circuitry must be used to process the incoming data. For applications in which the serial bit stream is operating at frequencies above approximately 50 megahertz, emitter coupled logic (ECL) or gallium arsenide (GaAs) fabrication technologies must be used rather than complimentary metal oxide silicon (CMOS) technology due to CMOS'S inability to operate at such speeds. ECL logic typically uses approximately ten times the power that an equivalent CMOS circuit would use which consequently requires a larger power supply and further requires additional design considerations due to the heat generated by such integrated circuit components, all resulting in a larger and more expensive circuit design than that which would otherwise be achievable using equivalent CMOS circuitry. Similarly, GaAs technology is much more difficult to fabricate than CMOS technology, resulting in much higher fabrication costs.

The present invention addresses the speed limitations of CMOS circuitry to perform frame synchronization detection of an incoming high speed bit stream which otherwise would be beyond the speed capabilities of CMOS circuitry by dividing the incoming bit stream into a plurality of parallel words, each word containing "N" bits where "N" is an integer greater than 1. Thus if N equals 4, the incoming high speed data would be divided into 4-bit parallel words with the operating frequency of such 4-bit words being exactly ¼ the incoming data bit stream.

The circuitry contains multiple (N) frame detectors. Each detector compares the bit pattern of the incoming parallel data to a known framing pattern. Each frame detector compares the incoming parallel data from a different starting bit location so that if the incoming parallel data contains a bit pattern matching the known framing pattern, it will be detected by one of the detectors during one comparison cycle. In this manner the byte boundary of the incoming data is determined.

This process is repeated for new incoming parallel data until the synchronization information is detected. If the detectors are comparing only a first portion of the synchronization information to a known bit pattern, then the remaining synchronization information is compared to a second known bit pattern immediately following detection of the first portion of the synchronization information.

This process can be repeated for as many units of synchronization information that are used per frame of data. Once a desired amount of synchronization information has been detected, the starting bit location within the incoming parallel data is used to identify the boundary for the incoming frame of data and all subsequent frames of data.

Once synchronization detection has occurred, the verification that synchronization information is received for subsequent frames is easily performed by the detectors observing the incoming parallel converted data at the precise time intervals when such data should be present.

It is this use of unsynchronized parallel data based upon an incoming high speed bit stream which distinguishes the present invention from other synchronization methods wherein a high speed data stream is observed without parallel conversion of the data prior to determining synchronization. The parallel word is generated without regard to frame or byte boundaries of the incoming data.

SUMMARY OF THE INVENTION

A parallel frame synchronization circuit and method according to the present invention is used to determine the location of frame synchronization information of an incoming high speed stream of data. Since such high speed data, when operating in the 50+ megahertz frequency range, requires use of emitter coupled logic or gallium arsenide fabrication technologies, the present invention is able to use significantly less expensive complimentary metal oxide silicon (CMOS) circuitry by first converting the incoming high speed bit data into parallel data words which effectively reduces the operating frequency for observing the parallel data. The operating frequency reduction is proportional to the number of bits comprising each parallel data word.

For example, if the high speed bit stream is converted into parallel words where each word comprises 4 bits, then the frequency of this 4-bit data is ¼ that of the high speed serial data. Due to this lower operating frequency of the parallel data, it is feasible to use CMOS circuitry in situations where the high speed data is operating at the 100 megahertz or higher frequency range. The present invention is applicable with any size parallel data, although the preferred embodiment of the invention as set forth in the Best Mode section divides the incoming data into 8 bit words.

In order to perform synchronization information detection, it is necessary that the known bit pattern be compared against the parallel data for every possible starting location of the parallel data.

For example, if the incoming serial bit stream is divided into arbitrary 4-bit parallel words and if the synchronization information is 4 bits in length, then in order to insure detection of the 4-bit synchronization information regardless of where within any given 4-bit parallel word the 4-bit synchronization word may begin, then four 4-bit pattern detectors would be necessary to simultaneously compare the first seven bits of two time-adjacent parallel data words. This comparison process would then be repeated for each subsequent 4-bit parallel word received.

If the synchronization information has a bit length greater than the parallel data words used by the frame synchronization detection circuitry and if a plurality of data latches are not used to allow simultaneous comparison of the entire known bit pattern to the incoming parallel data, then the subsequent portion or portions of the synchronization information can be compared to the corresponding portion or portions of a known bit pattern once the first portion of the synchronization information is detected. This subsequent synchronization information detection uses the same type of parallel bit pattern detectors as used to detect the first portion of the synchronization information. These detectors typically are additional detectors although the same detectors which detected the first portion of the synchronization information could be used if the comparison bit pattern is alterable by these detectors. In the preferred embodiment of the present invention, separate detectors are used to determine the presence of a second portion of the synchronization information.

Once all the synchronization information has been detected, then the specific starting bit location of the frame synchronization information is known via the address of the detector which found the matching synchronization information. Consequently the starting location of the frame of data is determined.

This correct data alignment is achievable through use of a multiplexer which uses the address of the detector which found the matching frame synchronization information so as to adjust transfer of all subsequent incoming data forming part of the frame (or subsequent frames) to be in correct word alignment. Typically such word alignment is on an eight bit byte boundary.

From the foregoing description, it is apparent that the parallel frame synchronization circuit and method is applicable for use with any type of continuous or packet-type communication link where a known framing pattern is used at the beginning of each frame to define the location of that frame in a serial data stream.

OBJECT OF THE INVENTION

It is therefore a principal object of the present invention to provide a parallel frame synchronization circuit which converts a high-speed serial bit stream into a lower speed parallel stream of multi-bit words, with use of a plurality of pattern detectors for comparing the multi-bit words to a known frame synchronization pattern so as to determine the location within the bit of the frame synchronization information regardless of the location where the incoming serial bit stream is converted into multi-bit parallel words.

Another object of the present invention is to provide a parallel frame synchronization circuit of the above description wherein the high-speed bit stream is converted into a lower speed parallel stream of multi-bit words wherein the frequency of the parallel multi-bit words is within the operating range of complimentary metal oxide silicon (CMOS) circuit technology, thereby providing for use of such circuitry for performing frame synchronization detection.

A still further object of the present invention is to provide a parallel frame synchronization circuit of the above description wherein the address of the particular pattern detector which detects the incoming synchronization information is used to control the operation of an associated multiplexer so that the parallel data emanating under control of the multiplexer is aligned on byte boundaries as determined by the frame synchronization information.

Other objects of the present invention will in part be obvious and will in part appear hereinafter.

DRAWINGS

For a fuller understanding in the nature and object of the present invention, reference should be made for the following detailed description taken in connection with the accompanying drawings, in which:

FIG. 1 is a diagram showing the 125 microsecond frame pattern of one channel of a particular telecommunication standard known as SONET, wherein the frame is represented by nine rows, each with 90 bytes and wherein the first two bytes of the first row are designated as A1 and A2 and generally contain framing information, and wherein the third byte of the first row is designated as C1 and generally contains the channel number corresponding to the channel of incoming data forming part of the SONET standard.

Figure 3:
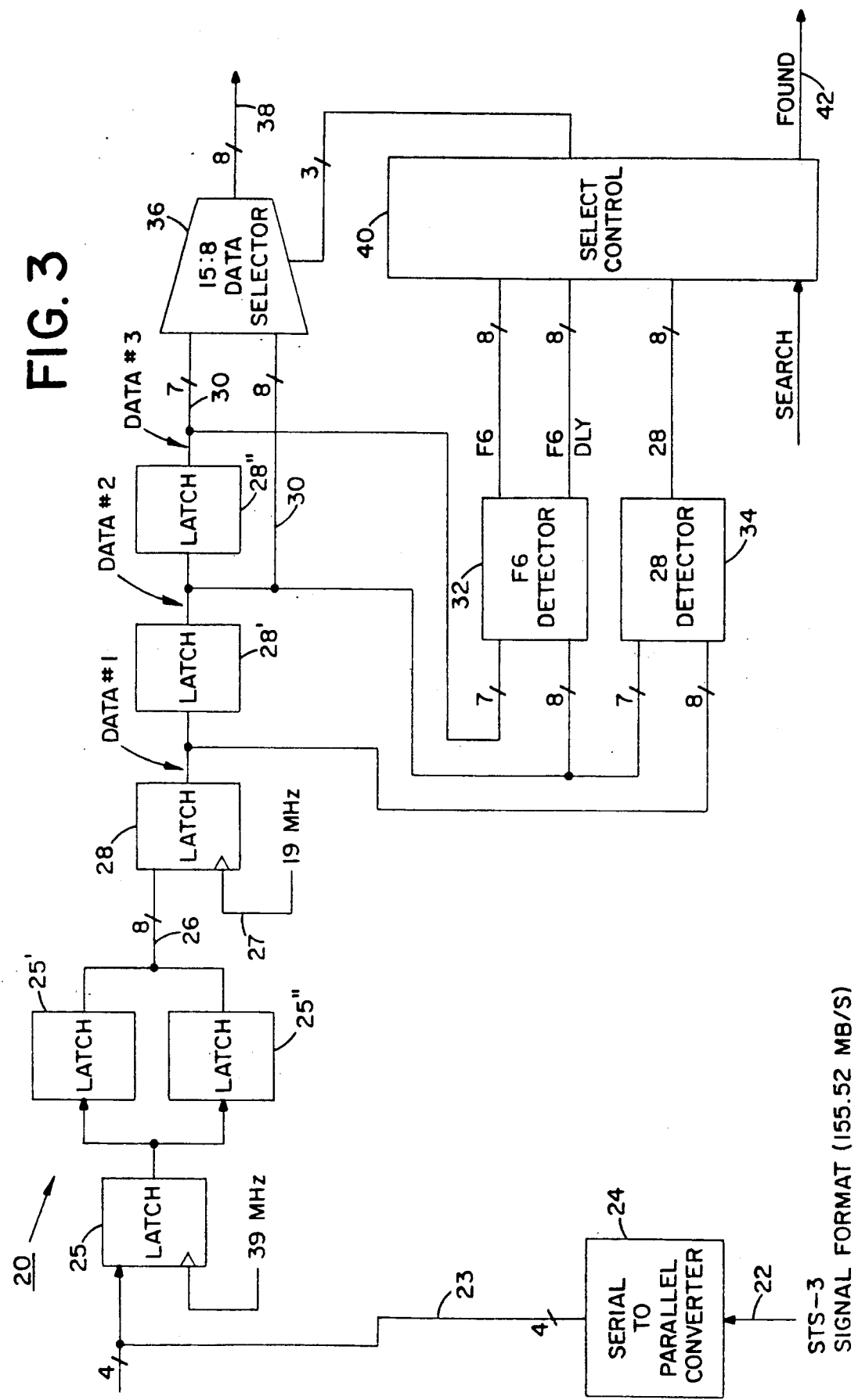
FIG. 3 is a block diagram showing how a plurality of known bit patterns (F6, F6, and 28, all hexidecimal) can be separately detected to determine frame synchronization.
Figure 4:
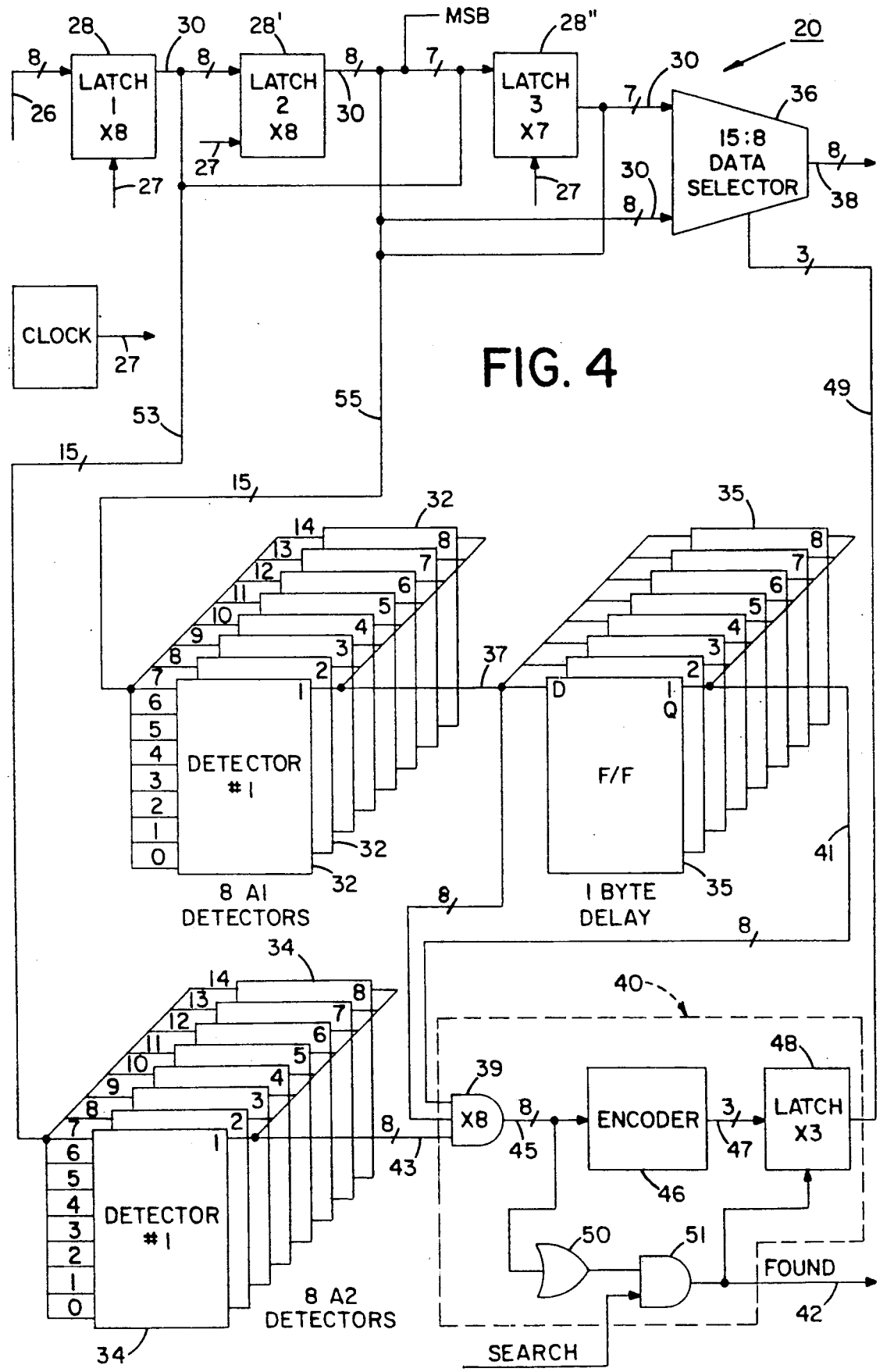

FIG. 4 is a detailed block diagram corresponding to FIG. 3 showing an incoming bit stream of high-speed serial data after conversion into parallel data words, each having a fixed bit length N, where in the given example, N equals 8, and also showing the use of multibit pattern detectors in association with the parallel data words so as to detect the presence of framing information by comparison of incoming parallel data to a known bit pattern.

Figure 5:
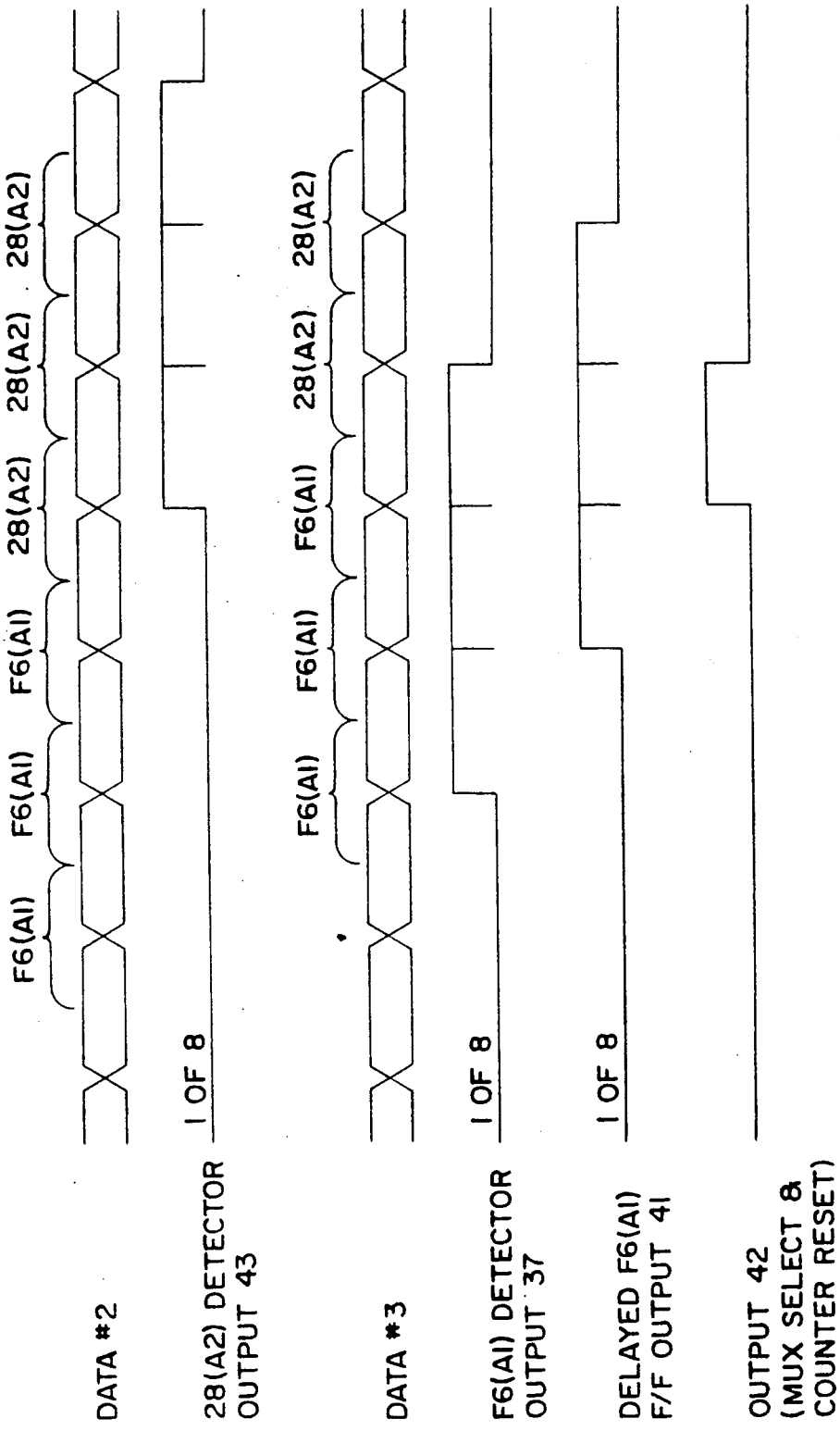

FIG. 5 is a timing diagram corresponding to the operation of the block diagram shown in FIGS. 3 and 4.

Figure 6:
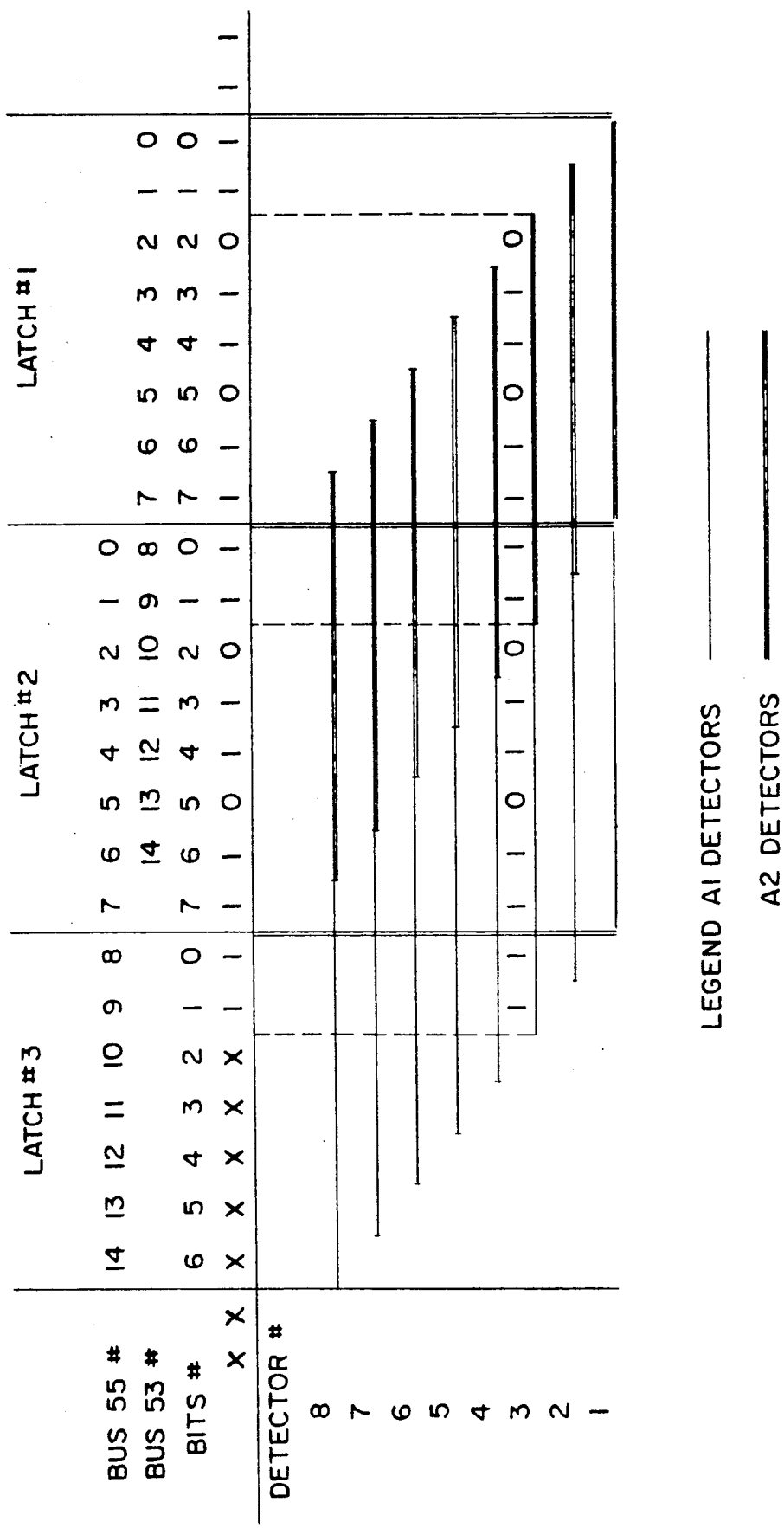

FIG. 6 is a diagram that illustrates frame information detection for an F6 framing information pattern.

BEST MODE FOR CARRYING OUT THE INVENTION

As seen in FIGS. 3-4, the present invention is a parallel frame synchronization circuit 20 for finding frame synchronization information imbedded within an incoming serial bit stream 22.

Figure 1:
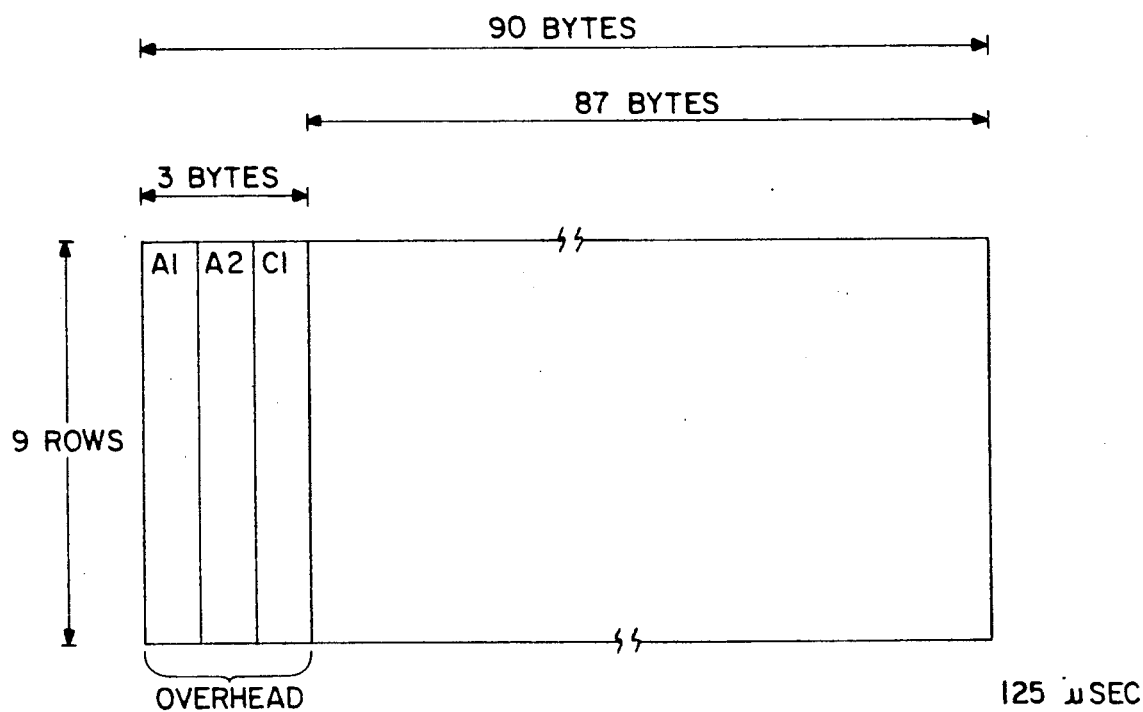

In one application of the present invention, the parallel frame synchronization circuit is used to find framing information associated with a frame of data as illustrated in FIG. 1. This type of frame comports to what is known as the Synchronous Optical NETwork (SONET) standard (American National Standards Institute, Inc. standard TI.105-1988). As seen in FIG. 1, this standard comprises a standard frame format. For one channel this format is 810 bytes, wherein the bytes can be visualized as residing in nine rows, each row comprising ninety bytes. The first three columns of each row represents what are considered overhead bytes, with the first two bytes of the first row generally designated by the names A1 and A2. Under the SONET standard, the A1 and A2 bytes of the first row contain a defined framing pattern.

The value of A1 is the eight bit pattern of 1111 0110 binary, or F6 hexidecimal. The A2 bit pattern is 0010 1000 binary, or 28 hexidecimal.

The third byte of the first row is designated by the name C1 and contains a channel identification number for the incoming data. For the SONET standard shown in FIG. 1, which comprises only one channel, the value of C1 would always be 01 for each frame. Specifically, the value of C1 ranges from 1 to Z for a Z channel system.

As also seen in FIG. 1, the 810 bytes of data comprising one frame of a single channel SONET standard is transmitted during a 125 microsecond time period which therefore equates to a bit transmission rate of 51.84 megabits per second $[(810 \times 8)/(125 \times 10^{-6})]$.

Figure 2:
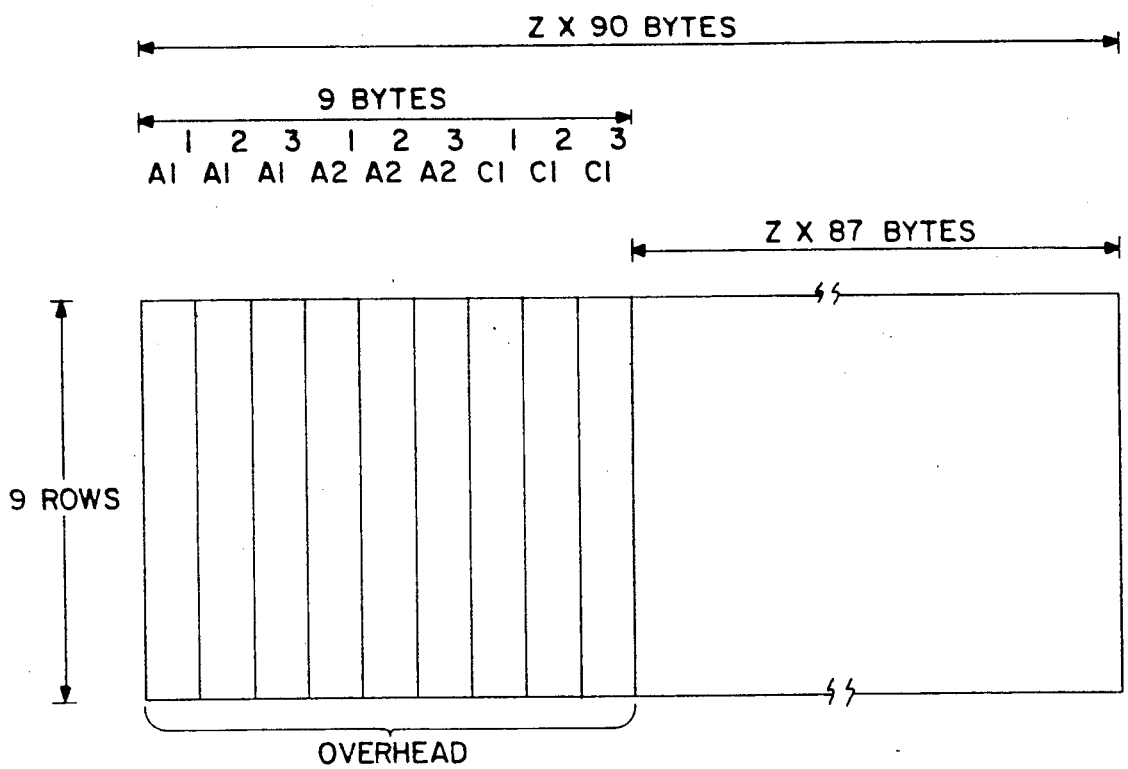
FIG. 2 is a diagram of the SONET standard wherein three channels of information are transmitted during a 125 microsecond time period, showing that for three channels there are nine rows of 3×90 bytes of information and again wherein the first nine bytes of the first row are designated as A1-1, A1-2, A1-3. A2-1, A2-2, A2-3, C1-1, C1-2, C1-3 for full three channels.

As seen in FIG. 2 for a multi-channel SONET standard, each additional channel has its 810 bytes transmitted along with the other channels, one byte at a time. Thus, the A1 byte is first transmitted for channel 1, then for channel 2, etc.. Then the A2 byte is transmitted for channel 1, then for channel 2, etc., through all 810 bytes comprising a frame for each channel. The 125 microsecond time period for transmitting all 810 bytes of all channels is maintained and consequently, the serial bit stream increases by a multiple equal to the number of channels. For the SONET STS-3 standard where three channels are used (Z=3, see FIG. 2), the bit stream rate is three times the STS-1 (FIG. 1) standard and thus, is 155.52 megabits per second.

The present invention is directed to identifying the presence of framing information, which for the SONET standard is directed to finding the A1 and A2 bytes of the 810 byte frame.

For the STS-1 standard comprising one channel of information, the preferred embodiment of the present invention locates the occurrence of the A1 and A2 framing bytes (framing information). This framing information has a length P, where P is an integer equal to the total number of bits of framing information used to detect frame synchronization. For the STS-1 frame standard, P is equal to 16 (two 8-bit bytes).

For a multi-channel SONET standard, the present invention can look for a plurality of A1 or A2 bytes for one or more channels. In a preferred embodiment of the invention, two A1 bytes followed by an A2 byte are searched for the STS-3 SONET standard.

Regardless of the particular framing bytes which are examined for purposes of determining the start of frame, the present invention uses the same technique for converting the serial data into lower speed parallel data; namely, converting the incoming serial bit stream into parallel data words, each comprising N bits, where N is an integer greater than one and typically is an integer equal to a power of two.

FIGS. 3 and 4 show an implementation of the parallel synchronization circuit designed to find the adjacent framing bytes A1-2, A1-3 and A2-1 of a three channel SONET standard (STS-3 configuration). In this implementation the incoming serial bit stream 22 is converted to a multi-bit parallel data word 23 by means of a serial to parallel converter 24 which must operate at the bit stream rate of the incoming data. This parallel data is first four bits in length. This four bit data is then converted into 8 bit parallel data 26 by means of latches 25 25' and 25" so that the clock frequency is further reduced from 38.88 MHZ to 19.44 MHZ. Since the incoming data for the STS-3 standard is arriving at 155.52 megabits per second, such conversion circuitry cannot easily be fabricated using complimentary oxide silicon (CMOS) technology which generally cannot operate reliably beyond 40 to 60 megahertz. Good design practice dictates that this converter be implemented in emitter-coupled logic (ECL) technology for an STS-Z implementation where Z is greater than 1 and equal to or less than 12, and in GaAs technology, where Z is greater than 12.

As shown in FIGS. 3 and 4, the serial to parallel convertor 24 generates a parallel data word output 26 comprising 8 bits of parallel data per word and thus has a transmission frequency equal to $\frac{1}{8}$ that of the incoming serial bit stream. The parallel data words are sequentially transferred to an 8-bit latch 28 under control of clock signals on output 27. Each subsequent data word causes the previous data words to be shifted to the next latch; that is, from latch #1 (28), to latch #2 (28'), to latch #3 (28")(see FIG. 6). The latches therefore act like parallel data shift registers with each latch having eight output lines 30 (only seven of these lines are necessary for latch 28"), with each output line representing the state of one of the bits in the 8-bit data word contained within the particular latch.

As also seen in FIG. 3, eight first framing byte pattern detectors 32 (A1 detectors) are each connected to eight of the output lines 30 of latches 28' and/or 28". The first detector (detector #1) is connected to the output lines of latch #2 (output lines 0-7), while detector #2 is connected to output lines 1 through 7 of latch #2 and line 0 of latch #3 (line 0 of latch 3 corresponds to line 8 shown in FIG. 4 connected to A1 detector #2), with this pattern sequentially increasing so that detector #8 is connected to output line 7 of latch #2 and output lines 0-6 of latch #3 (i.e. lines 7-14). The eight output lines connected to each detector are presented to each detector in parallel.

In this manner, each detector is able to simultaneously observe a unique bit pattern of eight sequential output lines of the latches. As noted above for the SONET standard, the first framing byte has the bit pattern 1111 0110 (F6 hexadecimal) and it is this bit pattern that each detector compares to the bit pattern for the output lines to which it is connected.

It is empirically observed that with eight 8-bit detectors configured as shown in FIG. 3, then an 8-bit framing byte must be detected, if present, regardless of the starting bit location of the framing byte, by examining the state of the lines 0–14 at least once after each 8-bit data word is sequentially transferred to the latches.

FIG. 6 shows an example where the data within latches 3 and 2 is as follows: don't care data for lines 14-10 of bus 55 (latch #3, bits 6-2; note that the letter "X" denotes any data; i.e. a 1 or a 0), the value 1 for lines 9 and 8 (latch #3, bits 2, 1), the values 1 1 0 1 1 0 for line 7-2 (latch #2, bits 7-2), and the values 1 1 for lines 1 and 0 (latch #2, bits 1,0).

Bits 7-0 of latch #1 have the values 1 1 0 1 1 0 1 1. It is seen in FIGS. 4–6 that the fifteen lines of bus 53 span latch #2, bits 6-0 and latch #1, bits 7-0, while bus 55 spans latch #3, bits 6-0 and latch #2 bits 7-0. It is also seen that for the example shown in FIG. 6, the A1-1 F6 framing byte (1 1 1 1 0 1 1 0 binary) spans latch #3, bits 1, 0 and latch #2, bits 7-2 (lines 9-2 of bus 55) while the A1-2 F6 framing byte spans latch #2, bits 1, 0 and latch #1, bits 7-2 (lines 9-2 of bus 53).

Again referring to FIG. 6, it is observed that one byte time (clock cycle) later, the A1-1 framing byte is partially beyond latch #3 and the A1-2 framing byte (see FIG. 2) is present on detector #3. A second byte time later the A1-3 framing byte is present on detector #3 followed by the A2-1 framing byte (28 hexadecimal).

One byte time before the A1-1 framing byte was detected by A1 detector #3, the A1-1 framing byte would only be partially located in latch #2 (namely, the most significant 2 bits of the bit pattern 1111 0110). It is also observed that regardless of the position of the framing byte within the 8-bit parallel words, that its detection will be assured provided that detectors 32 perform a detection operation at least once per every data word transfer.

It is therefore seen that bit 7 of latch #3 is not required since if the framing byte was on an 8-bit data word boundary, and thus residing from bits 7 to 0 of latch #3, then one byte time earlier, that same framing byte would reside at bits 7-0 of latch #2 and thus would be detected at that time by A1 detector #1.

It is also observed that if the detection process is performed after each 8-bit data word transfer, only two 8-bit latches need be used with eight 8-bit detectors for each framing byte to be detected.

Each detector 32 has a one bit output 37 which is activated when a detection is made. Thus if detector #3 found the A1 framing byte, its output line would be active.

Each A1 detector output line is connected to a corresponding one of eight one-byte delay flip-flop 35 and to a corresponding one of eight AND gate 39. Thus the A1 detector #1 output line is connected to an input of the #1 flip-flop and to an input of the #1 AND gate 39. Each flip-flop has an output 41 which is active if the flip-flop input was active (true) one parallel clock pulse earlier. In this manner, the A1 detectors and the flip-flops can monitor two time adjacent clock cycles. The output lines 37 and 41 of a corresponding A1 detector, flip-flop pair are both active when the first and second A1 framing bytes are detected and when the second and third A1 framing bytes are detected. FIG. 5 shows this occurrence.

In the preferred embodiment of the invention, two adjacent A1 framing bytes followed by an adjacent A2 framing byte are required to determine proper synchronization of the STS-3 SONET frame. Thus after two adjacent A1 framing bytes have been detected (i.e. the A1-2 and the A1-3 bytes), an A2 framing byte (the A2-1 framing byte) must be detected. This is performed by eight A2 detectors 34 whose operations are similar to those of the A1 detectors 32 except that they monitor the outputs of latches 28 and 28' (latch #1 and #2). Each A2 detector has a one bit output 43 which is connected to one input of the corresponding AND gate 39. Thus only one of the eight AND gates 39 has its output 45 enabled when the A1-2, A1-3, A2-1 framing byte sequence is detected (see FIG. 5). This particular AND gate output instructs encoder 46 to generate a three bit output signal on lines 47 which identifies the AND gate number and thus the framing byte boundary.

This signal is presented to a latch 48 which in turn presents the identifying information on its three line output 49 to data selector 36. Data selector 36 then selects the corresponding eight lines from latches 28' and 28" which correspond to the AND gate number. For example, if AND gate #3 has an enabled output, this represents A1 and A2 detection by corresponding detectors #3 which span lines 9-2. These lines are then selected by data selector 36 and presented an output 38.

The AND gates 39 in combination with encoder 46, latch 48 and logic gates 50 and 51 comprise a comparator circuit 40. Output line 42 is enabled when framing synchronization has been detected.

Based upon the previous example, it is seen that the mathematical expression defining the number of detectors (R) necessary to detect a unit of framing information is equal to the size of the incoming parallel data word times the sum of the truncated integer value of the quotient of the frequency of such parallel data words ($f_{pdw}$) divided by the frequency at which detector comparisons ($f_{dc}$) are made plus one (plus one if $f_{pdw}/f_{dc}$ has a remainder). That is:

$R = $ # of detectors $= N \times$ [truncated value of ((frequency of incoming parallel data words)/(frequency of detector comparisons))+1 if $f_{pdw}/f_{dc}$ has a remainder]; or $R = $ # of detectors $= N \times \{trunc[f_{pdw}/f_{dc}] + 1(+1$ if $f_{pdw}/f_{dc}$ has a remainder)$\}$.

For example, if N equals 4 and if the frequency of detector comparisons is equal to ½ the frequency of the incoming parallel data words, then the minimum number of detectors necessary is $R = $ # of detectors $= 4 \times$ [truncated value of $(1/.5) + 1$ if a remainder is present] $= 4 \times (2)$ (no remainder) $= 8$ detectors.

Since the frequency of detector comparisons ($f_{dc}$) of the data within the latches is not meaningful if performed at a frequency greater than that of the incoming parallel data words (since in such a case the parallel data words would not change between consecutive comparisons until such time as the parallel data word in fact changes), then the minimum number of detectors necessary when the frequency of detector comparisons is at least equal to the incoming parallel data frequency is just equal to the value of N; that is, the width of the incoming parallel data words.

From the foregoing, it is also apparent that the number of bits (Q, where Q is an integer) that each detector must observe is equal to the size of the unit of framing information desired to be detected per comparison, and as a maximum, is not larger than the total size of the framing information. The minimum size of the number of bits that each detector must observe is at least the size of the framing information (P) if the size of the framing information is equal to or less than the size of the parallel data words (N). Furthermore, if the size of the framing information is greater than the size of the parallel data words (P>N), then the minimum number of bits that each detector must observe is equal to the number of bits in the parallel data word times the sum of the truncated integer value of the quotient of $f_{pdw}$ divided by $f_{dc}$ plus one (plus one if the quotient has remainder), or $Q_{min} = R \times \{trunc[f_{pdw}/f_{dc}] + 1(+1$ if $f_{pdw}/f_{dc}$ has a remainder)$\}$.

For example, for the STS-1 SONET standard where the A1 and A2 bytes comprise the framing information and wherein these two bytes constantly equal sixteen bits of framing information (P=16), then the detectors as a maximum value need not observe more than sixteen bits each per detection comparison, but may detect as few as 8 bits where the incoming data is placed into 8-bit data words (N=8) by the serial to parallel convertor 24. The minimum frequency per comparison for these two extremes is once per two 8-bit parallel word transfers and once per one 8-bit parallel word transfer respectively. In the example shown in FIG. 3, each detector compares eight bits of output data which is therefore within the permissible rang of between eight and sixteen bits of data.

As seen in FIG. 4, the minimum number of outputs 30 (S, where S is an integer) necessary for framing information detection is equal to the number of bits (Q) associated with each detector 32 plus the number of detectors (R) necessary for framing information detection, minus one. That is, $$S = \text{minimum \# of output lines} = Q + R - 1.$$

From the foregoing, it is also apparent that the frequency of detector comparisons must at least be equal to the frequency of the incoming parallel data divided by the truncated integer value of the quotient of the number of bits compared by each detector divided by the number of bits of the incoming data words plus one if the quotient has a remainder. That is, $$\text{minimum } f_{dc} = f_{pdw} / \{ \text{trunc}(Q/N) + 1 (+1 \text{ if } Q/N \text{ has a remainder}) \}.$$

In other words, if the incoming data words have a size of 4 bits and if each detector is comparing a known bit pattern to 4 incoming bits of data from output lines 30, then the minimum frequency of detection must equal that of the incoming parallel data words, for otherwise it would be possible for an incoming data word not to be observed by any detector, assuming that the minimum number of detectors is as defined above. Similarly if each detector is comparing a known bit pattern of 5 bits, then $$f_{dc}(\text{min}) = f_{pdw} / \{ \text{trunc}(5/4) - 1 \text{ if remainder is present} \}$$

$$f_{dc}(\text{min}) = f_{pdw} / \{ 1 - 1 \}, \text{ remainder of 0.25 present}$$

$$f_{dc}(\text{min}) = f_{pdw}/2, \text{ or once every two parallel data word transfers.}$$

It is also seen from the foregoing analysis that in the unlikely event that the framing information has a bit length (P) less than that of the parallel output data (N), then the minimum number of bits (Q) associated with each detector must equal that of the framing information (P) rather than the number of bits in the parallel data words.

For example, if the framing information only comprises 3 bits (a very unlikely amount) then each detector must observe 3 bits output lines 30. In such a situation, the minimum number of detectors must still at least equal the value of N.

Once framing determination has been made, the circuitry no longer remains in the search mode; that is, it no longer looks at every unit of incoming parallel data. Rather, the circuit determines when the next framing byte should appear. For a single channel SONET standard this reoccurrence is 810 bytes after the A1 framing byte has been detected. The frame synchronization circuit can therefore look for the A1 and A2 framing bytes at their proper time sequence and if found, can continue this process until the proper framing information is not found and if so, reenter the search mode if the proper framing information is not found for one or more sequential frames.

Although the implementations shown are directed to telecommunication implementations embodying the SONET data communication framing standard, it is apparent that the circuitry and method for parallel frame synchronization detection can be used with any continuous or packet type communication link where a known unit of framing information is used at the beginning of each frame to define the beginning of said frame.

It will therefore be seen that the objects set forth above, and those made apparent from the preceding description, are efficiently attained and, since certain changes may be made in carrying out the above construction or method without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the parallel synchronization circuit and method described and all statements of the scope of this invention which, as a matter of language, might be said to fall therebetween.

Having described the invention, what is claimed:

1. A parallel frame synchronization circuit for detecting known frame synchronization information having a length of P bits, where P is an integer greater than one and at least equal to N, where N is an integer greater than one, the frame synchronization information denoting the presence of a frame of data, wherein the frame of data comprises a serial bit stream of data of frequency ($f_{in}$), the frame of data comprising more than P bits with the bits arranged in units of data, each unit of data comprising a fixed number of bits, the frame synchronization information also denoting the boundary between units of said data, comprising:

A) a serial to parallel converter for converting the incoming serial bit stream into parallel data words, each word comprising N bits, said parallel data words occurring at a frequency, $f_{pdw}$, equal to $f_{in}/N$;

B) means for receiving the parallel data words from the serial to parallel converter so as to present their output values on parallel output lines;

C) at least R addressable detectors forming a first group of detectors, where R is an integer at least equal to N times the sum of the truncated integer value of the quotient of the frequency of the parallel data words ($f_{pdw}$) divided by the frequency at which detector comparisons are made ($f_{dc}$), plus one (plus one if $f_{pdw}/f_{dc}$ has a remainder), that is, $R = N \times \{\text{truncated}[f_{pdw}/f_{dc}] + 1 (+1 \text{ if } f_{pdw}/f_{dc} \text{ has a remainder})\}$, each detector having Q inputs and one output line, where Q is equal to at least R but not greater than P if P is greater than N, the Q inputs of each detector connected to Q parallel output lines of the receiving means so that for each detector i, where i is an integer from 2 to Q, Q-1 inputs are connected to the same parallel output lines as detector i-1, so that the Q detectors span the parallel output lines of the receiving means, and further wherein each detector comprises means for determining at the detector comparison frequency ($f_{dc}$) if the incoming data bits from the receiving means parallel output lines correspond to at least a portion of the known frame synchronization information so as to generate a signal on its output line if a comparison is made; and D) means interconnected to each detector output line for effective receipt of the address of the detector that generated a signal, said means also connected to the parallel output lines of the receiving means for generating a parallel output of data aligned with the boundary of said units of data;

wherein the number of parallel output lines of the receiving means is at least equal to $Q+R-1$ and wherein the receiving means receives at least the truncated integer value of $\{(2Q/N)+1 \ (+1 \text{ if } (2Q/N) \text{ has a remainder})\}$ sequential parallel data words.

2. A frame synchronization circuit as defined in claim 1, wherein the value of N equals 8 and Q=8 and $f_{dc} = \frac{1}{8} f_{pdw}$.

3. A frame synchronization circuit as defined in claim 2, wherein each detector means for periodically determining if the incoming data bits correspond to at least a portion of the known synchronization information, operates at a frequency at least equal to the incoming frequency of the parallel data words divided by the sum of the truncated value of $\{Q/N+1, (+1 \text{ if } Q/N \text{ has a remainder})\}$.

4. A parallel synchronization circuit as defined in claim 1, wherein P may have a value less than N and if P is less than N, then the number of inputs Q associated with each detector is P.

5. A frame synchronization circuit as defined in claim 4, wherein each detector means for periodically determining if the incoming data bits correspond to at least a portion of the known synchronization information, operates at a frequency at least equal to the incoming frequency of the parallel data words divided by the sum of the truncated value of $\{Q/N+1, (+1 \text{ if } Q/N \text{ has a remainder})\}$.

6. A frame synchronization circuit as defined in claim 1, wherein each detector means for periodically determining if the incoming data bits correspond to at least a portion of the known synchronization information, operates at a frequency at least equal to the incoming frequency of the parallel data words divided by the sum of the truncated value of $\{Q/N+1, (+1 \text{ if } Q/N \text{ has a remainder})\}$.

7. A parallel frame synchronization circuit as defined in claim 1, wherein the receiving means generates $2Q+R-1$ parallel outputs lines, the parallel frame synchronization circuit further comprising a second group of R addressable detectors, each having Q inputs and one output line, for detecting a second portion of the frame synchronization information which follows the first portion of the frame synchronization information so as to generate an output if detection occurs, the second group of detectors connected to the parallel output lines of the receiving means in a manner so that only Q of the output lines are the same as those connected to the first group of detectors, and wherein the means for generating a parallel output of data aligned with the boundary of said units of data comprises means for logically combining the output lines of the first and second group of detectors, said means connected to the parallel output lines of the receiving means so as to generate a parallel output of data aligned with the boundary of the units of data when the second portion of the frame synchronization information is detected with detection of the first portion of the frame synchronization information.

8. A parallel frame synchronization circuit as defined in claim 7, wherein the frame synchronization information comprises 16 bits of information (P=16) and wherein the value of N equals 8, the value of Q equals 8, and the value of R equals 8 for both the first and second group of addressable detectors.

9. A parallel frame synchronization circuit as defined in claim 8, for detecting the presence of three portions of frame synchronization information forming said known frame synchronization information, further comprising means for delaying the detector output associated with the second group of detectors for a period of time equal to the period of $f_{dc}$, said delaying means having Q output lines, and wherein the output data aligning means further comprising means for logically ANDing the detector output lines of the first and second group of detectors in combination with the output lines of the delay means so as to generate a logic true state if, and only if, the outputs for the same detector associated with the two groups of detectors and the delay means are the same, said logic true state causing the parallel output data to be aligned with the boundary of the units of incoming data; whereby three portions of frame synchronization information can be separately detected.

10. A parallel frame synchronization circuit as defined in claim 1 for detecting frame synchronization information in which two adjacent portions of the frame synchronization information have the same value and wherein the first group of R addressable detectors detect the first portion of the frame synchronization information, and wherein the parallel frame synchronization circuit further comprises means having Q output lines, for delaying the output signals of the first group of R addressable detectors by an amount of time equal to the period of $f_{dc}$, said delayed information provided on its Q output lines, and wherein the first group of R addressable detectors also tests for the presence of the second portion of the synchronization information, and wherein the parallel output data aligning means further comprises a logic ANDing circuit for logically combining the delay means output lines with the output lines of the first group of R addressable detectors so as to generate a logic true state, if an only if, an output signal is detected on the same output line of both the first group of detectors and the delay means, said logic true state causing the parallel output data to be aligned with the boundary of the units of incoming data.

11. A parallel frame synchronization circuit for detecting known frame synchronization information having a length of P bits, where P is an integer greater than 1, the frame synchronization information forming part of a serial bit stream of data having a frequency $f_{in}$, comprising:

A) a serial to parallel converter for converting the incoming serial bit stream into parallel data words, each word comprising N bits, where N is an integer greater than 1;

B) means for receiving the parallel data words from the serial to parallel converter so as to present their output values on a first plurality of parallel output lines;

C) a second plurality of detectors, each detector having a third plurality of inputs so that the second plurality of detector inputs span the first plurality of parallel output lines of the receiving means, wherein each detector comprises an output line and means for determining if the data presented at its third plurality of inputs corresponds to at least a portion of the frame synchronization information so as to generate an output signal on its output line if a comparison is made; and D) means interconnected to each detector output line and to the parallel output lines of the receiving means for generating parallel output data aligned with the detector that generates an output signal on its output line an thus aligned with the frame synchronization information.

12. A parallel frame synchronization circuit as defined in claim 11, wherein the receiving means generates a fourth plurality of parallel output lines, the parallel frame synchronization circuit further comprising a fifth plurality of detectors for detecting a second portion of the frame synchronization information which follows the first portion of the frame synchronization information, the fifth plurality of detectors connected to the parallel output lines of the receiving means in a manner so that only a portion of the output lines are the same as those connected to the second plurality of detectors, each detector of the fifth plurality of detectors having an output line and means for generating an output signal on its output line if detection of the second portion of frame synchronization information occurs, and wherein the means for generating parallel output data aligned with the frame synchronization information comprises means connected to the output lines of the second and fifth plurality of detectors so as to generate such an output of data when both the first and second portions of the frame synchronization information are detected.

13. A parallel frame synchronization circuit as defined in claim 11, wherein the frame synchronization information comprises at least first and second time adjacent portions having the same information and wherein the parallel frame synchronization further comprises a sixth plurality of flip-flops, each having an input connected to an output of one of the fifth plurality of detectors and each having an output which reflects the state of its input a period of time earlier equal to the period of $f_{dc}$, and further comprising means for receipt of the output of each flip-flop and each output of each detector, the output of said logic means interposed between each detector and the means for generating the parallel output of data aligned with the boundary of the units of data so that frame synchronization is determined when the adjacent portions of the frame synchronization information are detected by the detectors and flip-flops.

14. A parallel frame synchronization circuit for detecting known frame synchronization information having a length of P bits, where P is an integer greater than one and at least equal to N, where N is an integer greater than one, the frame synchronization information denoting the presence of a frame of data, wherein the frame of data comprises a serial bit stream of data having frequency $f_{in}$, the frame of data comprising more than P bits, comprising:

A) a serial to parallel converter for converting the incoming serial bit stream into parallel data words, each word comprising N bits;

B) means for receiving the parallel data words from the serial to parallel converter so as to present their output values on 2N-1 parallel output lines;

C) at least N addressable detectors, each detector having N inputs and one output line, the N inputs of each detector connected to N parallel output lines of the receiving means so that for each detector i, where i is an integer from 2 to N, N−1 inputs are connected to the same parallel output lines as detector i-1, so that the N detectors span the 2N-1 parallel output lines of the receiving means, each detector further comprising means for determining if the incoming data bits from the receiving means parallel output lines correspond to at least a portion of the known frame synchronization information so as to generate an output signal on detector i's output line if a comparison is made by detector i; and D) means, having N output data lines, connected to each detector output line for receipt of a detector output signal, if present, said means also connected to the 2N-1 parallel output lines of the receiving means for generating on the N output data lines, an aligned parallel output of data corresponding to the N parallel output lines associated with the detector which generated the output signal.

15. A parallel frame synchronization circuit as defined in claim 14, wherein the means for receiving the parallel data words from the serial to parallel converter further comprises means so as to present output values corresponding to 3N-1 adjacent bits of data from the incoming serial bit stream of data onto 3N-1 parallel output lines, wherein the N addressable detectors are considered a first group of addressable detectors and further wherein the parallel frame synchronization circuit comprises a second group of at least N addressable detectors, each detector having N inputs and one output line, the N inputs of each detector connected to N parallel output lines of the receiving means so that said second group of N detectors span 2N-1 parallel output lines of the receiving means, including N-1 lines the same as those interconnected to the first group of N addressable detectors and the N additional lines generated by the parallel data receiving means so that the two groups of addressable detectors span the 3N-1 parallel output lines of the receiving means, and further wherein the parallel frame synchronization circuit output data aligning means comprises a logic ANDing means connected to the output lines of the first and second group of addressable detectors for generating a logic true state, said ANDing means having N output lines on which the logic true state is generated if corresponding detectors in the first and second group of N addressable detectors generate an output signal at the same time and further wherein the output data aligning means is interconnected to the output lines of the logic ANDing means for determining the particular N parallel output lines associated with the detected frame synchronization information.

16. A parallel frame synchronization circuit as defined in claim 15, where P equals 16 and wherein the first and second portions of the frame synchronization information detected by the first and second groups of addressable detectors are each equal to 8 bits and further wherein N is equal to 8 bits.

17. A parallel frame synchronization circuit as defined in claim 15, for the detection of three portions of frame synchronization information, each having a length of N bits, further comprising means for delaying the output signals associated with the second group of addressable detectors for a period of time sufficient to detect a third portion of the frame synchronization information, said delay means having output lines on which said delayed output signals are generated, the output lines connected to the inputs of the logic ANDing means, wherein the logic ANDing means generates a logic true state if the same detector in the same first and second group of detectors and the corresponding delay element in the delay means generate an output signal at the same time.

18. A parallel frame synchronization circuit as defined in claim 17, wherein P is equal to 24 and the second and third portions of the frame synchronization each equal 8 bits, wherein N is equal to 8 and further wherein two adjacent portions of the frame synchronization information have the same binary value.

19. A method of detecting known frame synchronization information having a length of P bits, where P is an integer greater than 1, the frame synchronization information formation part of a serial bit stream of data having a frequency $f_{in}$, comprising:
   A) converting the serial bit stream of data into parallel data words, each word comprising N bits, where N is an integer greater than 1;
   B) latching the parallel data words so as to present their output values on a first plurality of parallel output lines;
   C) determining via a second plurality of detectors having inputs which span the parallel output lines, if the data corresponds to at least a portion of the frame synchronization information so as to generate an output signal corresponding to the detector that detected at least a portion of the frame synchronization information; and
   D) generating parallel output data aligned with the detector that generates an output signal and thus aligned with the frame synchronization information.

20. A method of detecting known synchronization information as defined in claim 19, wherein the latching step further latches additional parallel data words and generates a third plurality of parallel output lines corresponding to this additional latched data, and wherein the determining step comprises a fourth plurality of detectors for detecting a second portion of the frame synchronization information which follows the first portion of the frame synchronization information, the fourth plurality of detectors spanning a portion of the parallel output lines that are the same as those spanned by the second plurality of detectors, each detector of the fourth plurality of detectors generating an output signal if detection of the second portion of frame synchronization information occurs by that detector, and wherein the step of generating aligned parallel output data generates such parallel output data when both the first and second portions of the frame synchronization information are detected by respective detector output signals from the second and fourth pluralities of detectors.

21. A method of detecting known synchronization information as defined in claim 20, wherein the frame synchronization information comprises at least first and second time adjacent portions having the same information and wherein the method further comprises the step of receiving and delaying the output signals of the fourth plurality of detectors, and further comprising the step of receiving said delayed output signals and each output signal of each detector from the second and fourth pluralities of detectors, and generating a logic true signal when it is determined that the adjacent portions of the frame synchronization information are detected by the second and fourth plurality of detectors and the delaying step, and wherein the logic true signal causes the step of generating aligned parallel output data to be aligned with the logic true signal.

* * * * *

UNITED STATES PATENT AND TRADEMARK OFFICE
CERTIFICATE OF CORRECTION

PATENT NO.   :   5,081,654
DATED        :   January 14, 1992
INVENTOR(S)  :   Stephenson, Jr. et al.

It is certified that error appears in the above-identified patent and that said Letters Patent is hereby corrected as shown below:

```
Col. 2, line 52, after "section" insert --,--;
Col. 4, line 27, "full" should be --all--;
Col. 9, line 7, "rang" should be --range--;
Col. 10, line 54, "}" should be --{--;
Col. 15, line 15, "formation" should be --forming--.
```

Signed and Sealed this

Twenty-seventh Day of April, 1993

Attest:

MICHAEL K. KIRK

Attesting Officer

Acting Commissioner of Patents and Trademarks